Figure 1:
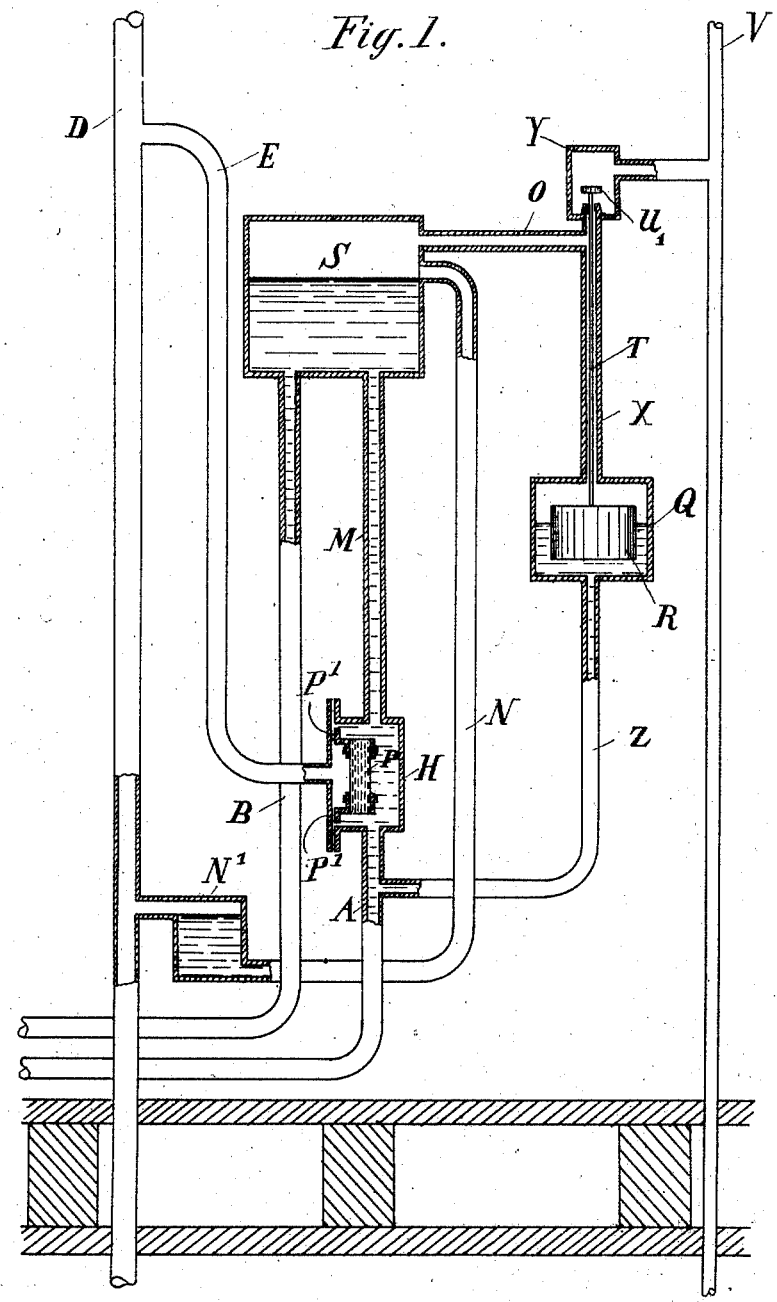
Figure 1:

No. 776,939. PATENTED DEC. 6, 1904.
A. B. RECK.
HOT WATER HEATING APPARATUS.
APPLICATION FILED OCT. 16, 1902.
NO MODEL. 3 SHEETS—SHEET 1.

WITNESSES:
W. M. Avery
H. L. Bruhof

INVENTOR
Anders Borch Reck
BY

ATTORNEYS.

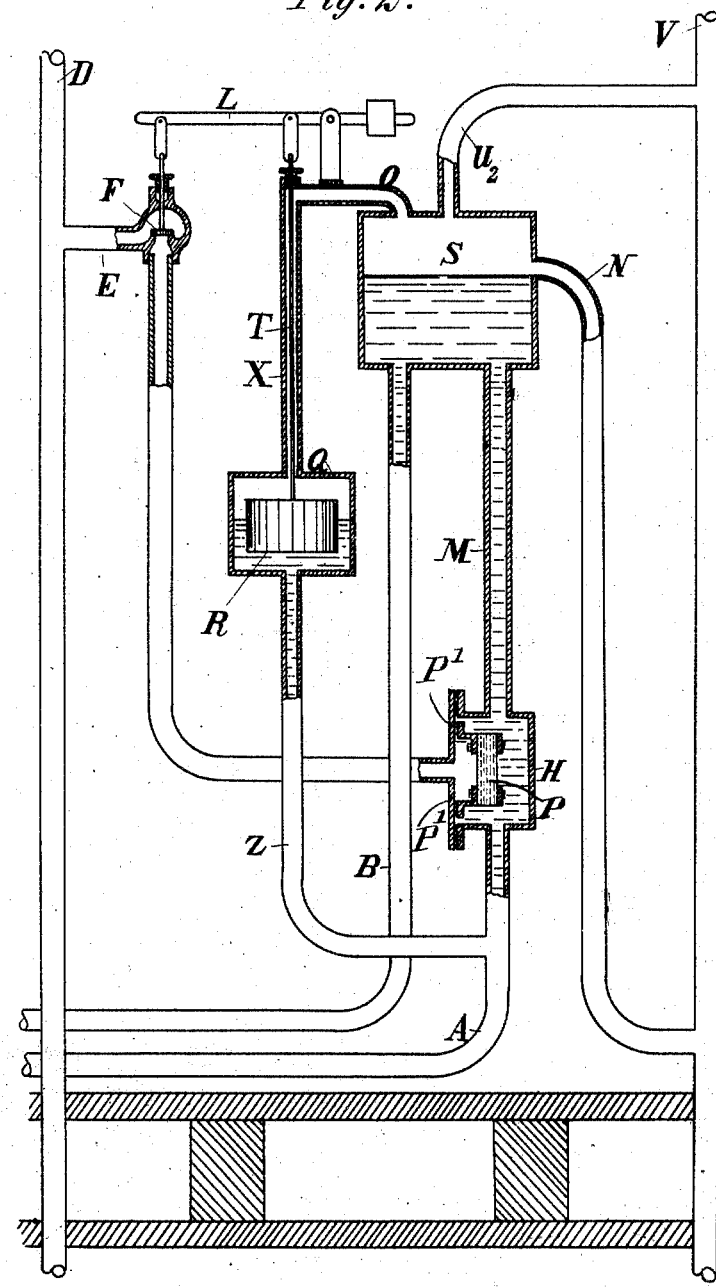

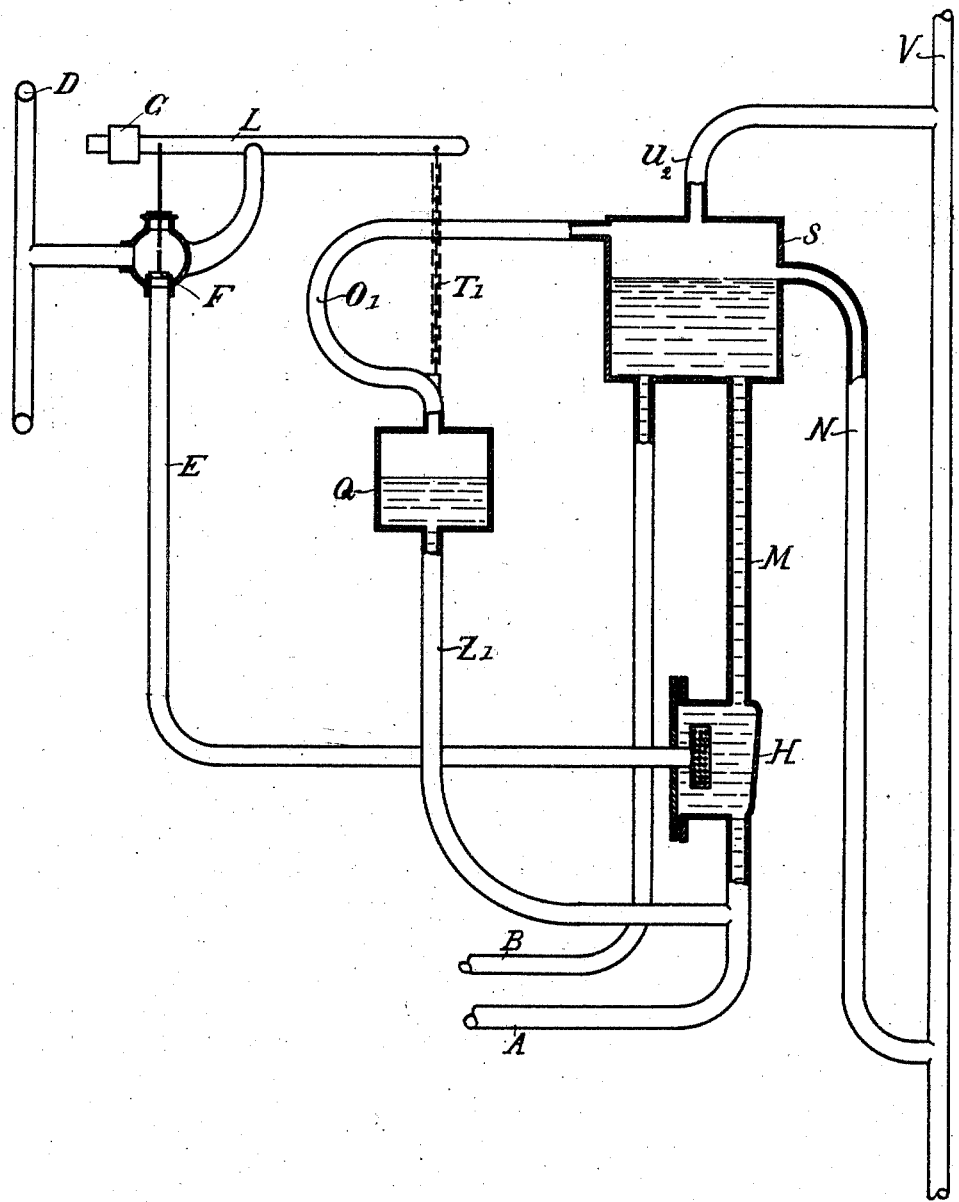

No. 776,939.

Patented December 6, 1904.

UNITED STATES PATENT OFFICE.

ANDERS BORCH RECK, OF COPENHAGEN, DENMARK.

HOT-WATER HEATING APPARATUS.

SPECIFICATION forming part of Letters Patent No. 776,939, dated December 6, 1904.

Original application filed January 31, 1898, Serial No. 668,618. Divided and this application filed October 16, 1902. Serial No. 127,500. (No model.)

*To all whom it may concern:*

Be it known that I, ANDERS BORCH RECK, a subject of the King of Denmark, and a resident of Copenhagen, Denmark, have invented a new and Improved Hot-Water Heating Apparatus, of which the following is a full, clear, and exact description.

My invention relates to hot-water heating apparatus of that class in which steam is introduced directly into the water to be heated.

The subject-matter of this application is a division of a prior application for hot-water circulating apparatus filed by me in the United States Patent Office on January 31, 1898, Serial No. 668,618.

Hot-water heating apparatus of that class in which steam introduced into a water-heater is mingled directly with the water, whereafter it passes into a reservoir in which the steam is separated from the water, have hitherto had only a very limited application to common house-heating on account of their uneconomical operation, lack of means for regulation, and in most cases their dependence on high pressure, which features are very objectionable in house-heating, but do not prevent the application of the system to some special purposes, such as particularly the heating of railroad-cars.

The object of this invention is the construction of an apparatus of the above-indicated class in which a very economical operation and exact regulation can be obtained by the same low steam-pressure that is now used in common house-heating steam-boilers. The novel features by which I secure this result are defined in the appended claims.

The invention may be carried out as shown in the drawings, in which—

Figure 1 is a diagrammatic elevation of the system. Fig. 2 is a diagrammatic elevation of a modified form of the system; and Fig. 3 is a diagrammatic elevation of a modified form of certain parts shown by the system of Fig. 2, certain parts in all the figures being shown in section.

In the figures, E is a steam-pipe leading to a tank H, in which the water is heated, the steam escaping into the water through the meshes of several layers of wire-gauze P, held firmly between two iron frames P'. From the heating-tank H a pipe M conveys the water supplied from a pipe A to a separator-tank S, which is in communication with a radiator or system of radiators (not shown) through a pipe B. The pipe A, that supplies water to the heating-tank, communicates with the same radiator or system of radiators. N is an overflow-pipe from the separator-tank S.

When the apparatus is to be used, it is filled with water until the water in the separator-tank S rises to the level of the overflow-pipe N. Some water will enter the steam-pipe E. When steam now enters into pipe E, it drives out the water from said pipe and penetrates through the wire-gauze P into the heating-tank H. Here its velocity will be reduced. It will mingle with the water and condense, the condensation bringing the temperature of the water up to the temperature of the steam. The hot water now rises through the pipe M into the tank S. As it rises it will gradually come under less and less pressure, because the layer of water will get thinner, and thus some of the steam condensed in the water will be redeveloped, reducing the specific gravity of the ascending column of water in the rising pipe M to about half the specific gravity of unmixed water. Even in buildings where the distance from the separator-tank to the radiators farthest away is more than three hundred feet the height of the rising pipe M need not be more than about four feet, even if the velocity of the water is desired to be about four times as large as usual in common gravity hot-water heating. The steam developed in the rising pipe M will separate from the water in tank S. To give room for such steam, the upper part of the separator-tank must be provided with an outlet for the air standing over the water before steam is turned on. Figs. 1 and 2 in the drawings show two different forms of outlet for the air, as will be described later on. When the air has been expelled from the separator-tank S, the steam will condense on the inner part of its upper surface. In small apparatus these surfaces will suffice for condensing all the steam developed in the rising pipe M. In large apparatus the inner surfaces of the separator-tank must be supplemented by other condensing apparatus; but these not being essential parts of the invention are not described here nor shown in the drawings. It will be seen that when the air has escaped from the separator-tank and the air-outlet from this tank has been closed, automatically or otherwise, the steam-pressure in the separator-tank will be equivalent to the difference between that in the pipe E and that represented by the head of the water-column from the level of the inlet of the steam-pipe E into the heating-tank H to the level of the water in the tank S. Therefore if the steam, as shown in Fig. 1, is taken from a vertical steam-pipe (riser) D it will be possible to let the condensed water flow back by gravity to the same steam-pipe by returning it through a little tank N' or other water seal in the overflow-pipe N.

To make the system applicable to common house-heating it is very essential that the pressure in the separator-tank and the supply of steam to the heating-tank should be kept automatically at the proper point.

In Fig. 1 the regulating-chamber is a tank Q, the top and bottom of which communicate, respectively, with the upper part of the separator-tank by pipes O and X and with the lower part of the heating-tank H by pipe Z. The tank is placed at such a height that when the water sinks in pipe X by the effect of the boiling of the water in pipe M the level of the water will finally be in the tank Q. In this tank is placed a float R, bearing a rod T, that connects the float with a valve U' in such a manner that the valve shuts when the float sinks and opens again when the float rises. The valve U' opens into a chamber Y, that communicates with a pipe V. It will now be seen that the valve U' will keep open and act as an outlet for air and steam as long as the boiling of the water in pipe M is so weak that the column of water directly above the junction of the pipes A and Z and supported by the column in the parts H, M, and S is sufficiently high to keep the level of the water in the tank Q high enough to cause the float R to remain in raised position; but when the ebullition in the tank H increases the weight of water in the parts H, M, and S of the water-column will tend to decrease, the water in the tank Q will come down to its proper level, thus indicating that the head for the circulation of the water through pipes B and A and the radiator system is sufficient, and the float R will sink and close valve U', so that no more steam escapes to pipe V. It will be especially advantageous to employ the manner of regulation shown in Fig. 1, when two or more heating-tanks H each with its appurtenant hot-water heating system are supplied with steam from a common steam-generating plant. If a vacuum is maintained in a main exhaust-pipe to which the pipes V from all the individual hot-water systems are connected, the vacuum in each pipe V can be transmitted to the separator-tank connected to it, and thus the circulation of the water in the heating systems can be maintained, even if the pressure of the common steam-supply falls under atmospheric pressure and approaches the pressure in the pipes V.

Fig. 2 represents a modified form of the invention, whereby the current of steam or other heating medium that flows through the pipe E, heater H, pipe M, and tank S is controlled by a valve in the pipe E instead of by a valve in the outlet from the tank S, as shown in Fig. 1. The description of the regulating-tank made with reference to Fig. 1 applies to Fig. 2 also. Only the rod T from float R here is shown going out through a stuffing-box and connected to a lever L, that actuates a valve F in the steam-supply pipe E, leading to the heating-tank H, the lever closing the valve when the float R sinks and opening it again when the float rises. It will be seen that the valve F will remain open and allow the steam to go to the heating-tank H as long as the boiling of the water in pipe M is not sufficiently strong to reduce the weight of water in that pipe enough to keep the water-level in the tank Q down to its normal point and cause the downward movement of the float R; but as soon as ebullition in the pipe M has increased sufficiently to cause water to flow from the pipe Z into the pipe A the water in tank Q will come down to its proper level, thus indicating that the heat for the circulation of the water through pipes A B and the radiator system connected to these pipes is sufficient, the float R will sink, and the valve F will close, so that only steam enough goes to the heating-tank to maintain the circulation of the water. As an outlet for air and steam from the separator-tank S, I have shown in Fig. 2 an open pipe U², communicating with a pipe V. When a constant pressure is kept in this pipe V, the pressure will then always be the same as in V over the water in the separator-tank, and thus the temperature at which the water will boil in the pipe M will be dependent only upon the pressure in pipe V and not on the steam-pressure in the steam-supply pipe D, provided only that this last pressure is at least a little higher than the pressure in the pipe V.

The manner of regulation shown in Fig. 2 will be especially advantageous when it is desired to secure a constant temperature for the water flowing out into pipe B from the separator-tank independently of the pressure in the pipe D or in the boiler from which the steam is drawn. By varying the pressure in pipe V over or under atmospheric pressure it is possible to vary the temperature in all of the radiators connected to the heating system in accordance with the amount of heat required in the building in which the radiators are placed.

In the drawings the heater (radiator or system of radiators) is not shown. It may be of any suitable construction and does not form any part of my invention. The pipes A and B, leading the water to and from the heater, may be arranged in different ways. The construction of the inlet of the steam into the heating-tank H does not form any part of the invention. Any other construction will do here, provided only that it allows the water in the heating-tank to be directly heated by the condensation of the steam, the current of steam being reduced in velocity and distributed among a great number of small channels before it mingles with the water, so that the water can be heated up to the temperature of the inflowing steam, the pressure of the water and the steam in the heating-tank H being very nearly the same.

The construction of a float R and rod T, by which the fall of the water in the regulating-tank is transferred to the valve U', as in Fig. 1, or valve F, as in Fig. 2, does not form any part of the invention. Any other manner of transferring such a movement of the water to a valve known in the art may be employed. The regulating-tank Q may, for instance, be suspended, as shown in Fig. 3, by a chain T', which is fixed to the lever L. The pipes O' and Z', connecting the tank Q with the separator S and the pipe A, are made flexible. The apparatus will then act in the following way: When the water is sucked down in the tank Q by the suction created by the steam rising in the pipe M, the weight G of the lever L, which is kept in equilibrium by the tank Q when said tank is full, will descend and cause the valve F to shut off the admission of steam through the pipe E. When the water again flows back to the tank Q, said tank will again be heavier and raise the weight G, and the valve F will again be opened for the admission of steam.

Having thus described my invention, I claim as new and desire to secure by Letters Patent—

1. In an apparatus for water circulation, the combination of a heating-tank for heating water by steam, a pipe rising from the upper part of said tank, a separator-tank connected with the upper end of said rising pipe and provided with an overflow-pipe for water, an escape for air and steam in communication with the upper part of said separator-tank, a regulating chamber or tank, placed lower than the water-line in the separator-tank, the top and bottom of the chamber communicating respectively with the upper part of the separator-tank and the lower part of the heating-tank, means for transferring the change of the water-level in the regulating-tank to a valve that controls the flow of a heating medium through the apparatus, a pipe for conveying the heated water from the lower part or water-space of the separator-tank to a radiator or other heating appliance, and a return-pipe for conveying the comparatively cool water from the radiator to the heating-tank.

2. In an apparatus for water circulation, the combination of a heating-tank for heating water by steam, a pipe rising from the upper part of said tank, a separator-tank connected with the upper end of said rising pipe and provided with an overflow-pipe for water and on its upper part with an outlet for air, a valve in the steam-pipe to the heating-tank, a regulating chamber or tank placed lower than the water-line in the separator-tank, the top and bottom of the chamber communicating respectively with the upper part of the separator-tank and the lower part of the heating-tank, a float in said regulating-tank, a connection from the float to the steam-pipe valve, a pipe for conveying the heated water from the lower part or water-space of the separator-tank to a radiator or other heating appliance, and a return-pipe for conveying the comparatively cool water from the radiator to the heating-tank.

3. In an apparatus for water circulation, the combination of a heating-tank, means for conveying a heating medium thereto, an elevated separator-tank, a pipe connecting the heating and separator tanks, water-circulating pipes connected respectively to the heating-tank and the separator-tank, a regulating-tank located below the separator-tank and having operative connection with said tank above the water-level therein, and with one of said water-circulating pipes, and means connected to said heat-conveying means and controllable by the variation of the level of water in the regulating-tank for controlling the circulation of a heating medium through the apparatus.

4. In an apparatus for water circulation, the combination of a heating-tank for water, a steam-pipe connected therewith, a pipe extending upwardly from the upper part of said tank, a separator-tank connected with the upper part of said pipe and provided with an overflow-outlet, a regulating chamber or tank located lower than said overflow-outlet, connections between the upper and lower parts of said regulating-chamber and the separating-tank and heating-tank respectively, means for causing change of level of water in said regulating-chamber to control the flow of steam through said steam-pipe, means for conveying hot water from said separating-tank to a heating appliance or system, and means for returning the water to the heating-tank.

5. In an apparatus for water circulation, the combination of a water-column provided with an overflow-outlet in its upper part, a steam-pipe entering said column in its lower portion for heating the water, a regulating-chamber located at a lower point than said overflow-outlet and having a water-space and a steam-space, a connection between said steam-space and said water-column above the overflow-outlet, a connection between said water-space and said water-column below the point at which the steam-pipe enters it, whereby the level of water in said chamber will be regulated by said water-column, a regulating-valve in said steam-pipe, means for causing the position of said valve to be controlled by the level of water in said chamber, means for conveying hot water from the upper part of said column at a point below the overflow-outlet to a heating appliance, and means for returning the water from the heating appliance to the lower part of the water-column.

In witness whereof I have hereunto set my hand.

ANDERS BORCH RECK.

Witnesses:
H. D. JAMESON,
A. NUTTING.